(12) United States Patent
Abusleme et al.

(10) Patent No.: US 10,982,062 B2
(45) Date of Patent: Apr. 20, 2021

(54) FLUOROPOLYMER HYBRID COMPOSITE

(71) Applicant: SOLVAY SA, Brussels (BE)

(72) Inventors: Julio A. Abusleme, Saronno (IT);
Matteo Lavaselli, Momperone (IT);
Christine Hamon, Bollate (IT);
Alberto Frache, Alessandria (IT);
Giambattista Besana, Mariano Comense (IT); Giovanni Camino, Turin (IT); Ségolène Brusseau, Tavaux (FR)

(73) Assignee: Solvay SA, Brussels (BE)

( * ) Notice: Subject to any disclaimer, the term of this patent is extended or adjusted under 35 U.S.C. 154(b) by 222 days.

(21) Appl. No.: 15/777,092

(22) PCT Filed: Nov. 16, 2016

(86) PCT No.: PCT/EP2016/077822
§ 371 (c)(1),
(2) Date: May 17, 2018

(87) PCT Pub. No.: WO2017/085101
PCT Pub. Date: May 26, 2017

(65) Prior Publication Data
US 2018/0371194 A1 Dec. 27, 2018

(30) Foreign Application Priority Data

Nov. 17, 2015 (EP) .................... 15306821

(51) Int. Cl.
| | |
|---|---|
| *H01M 2/16* | (2006.01) |
| *H01M 2/14* | (2006.01) |
| *C08J 5/22* | (2006.01) |
| *C08L 71/02* | (2006.01) |
| *C08L 27/16* | (2006.01) |
| *C08K 5/5415* | (2006.01) |
| *H01M 10/052* | (2010.01) |

(52) U.S. Cl.
CPC .............. *C08J 5/225* (2013.01); *C08J 5/22* (2013.01); *C08J 5/2237* (2013.01); *C08K 5/5415* (2013.01); *C08L 27/16* (2013.01); *C08L 71/02* (2013.01); *H01M 2/145* (2013.01); *H01M 2/166* (2013.01); *H01M 2/1646* (2013.01); *H01M 2/1653* (2013.01); *C08J 2371/02* (2013.01); *C08J 2427/16* (2013.01); *H01M 10/052* (2013.01); *H01M 2300/0068* (2013.01); *H01M 2300/0082* (2013.01); *H01M 2300/0091* (2013.01)

(58) Field of Classification Search
CPC ....... C08J 5/225; C08J 5/22; C08J 5/18; C08J 5/2237; C08J 2371/02; C08J 2427/16; C08L 27/16; C08L 71/02; C08K 5/5415; H01M 2/145; H01M 2/1646; H01M 2/1653; H01M 2/166; H01M 2300/0068; H01M 10/052; H01M 2300/0091; H01M 2300/0082; B29B 7/18
See application file for complete search history.

(56) References Cited

U.S. PATENT DOCUMENTS

| | | | |
|---|---|---|---|
| 2013/0023620 A1* | 1/2013 | Abusleme | ................ C08F 8/00 524/546 |
| 2014/0131268 A1* | 5/2014 | Abusleme | ................ C08J 5/18 210/321.6 |

FOREIGN PATENT DOCUMENTS

| | | | | |
|---|---|---|---|---|
| WO | 2012175416 A1 | 12/2012 | | |
| WO | 2013072216 A1 | 5/2013 | | |
| WO | 2014067816 A1 | 5/2014 | | |
| WO | WO-2014067816 A1 * | 5/2014 | ............ | C08J 3/2056 |
| WO | 2014095907 A1 | 6/2014 | | |
| WO | WO-2014095907 A1 * | 6/2014 | ............. | C08L 27/16 |
| WO | 2015169834 A1 | 11/2015 | | |

* cited by examiner

*Primary Examiner* — Lisa S Park
(74) *Attorney, Agent, or Firm* — Osha Bergman Watanabe & Burton LLP

(57) ABSTRACT

The present invention pertains to a fluoropolymer hybrid organic/inorganic composite, to a film comprising said fluoropolymer hybrid organic/inorganic composite and to uses of said film in various applications, in particular in electrochemical and in photo-electrochemical applications.

19 Claims, No Drawings

FLUOROPOLYMER HYBRID COMPOSITE

This application is a U.S. national stage entry under 35 U.S.C. § 371 of International Application No. PCT/EP2016/077822 filed Nov. 16, 2016, which claims priority to European application No. EP 15306821.8 filed on Nov. 17, 2015. The entire contents of these applications are explicitly incorporated herein by this reference.

TECHNICAL FIELD

The present invention pertains to a fluoropolymer hybrid organic/inorganic composite, to a film comprising said fluoropolymer hybrid organic/inorganic composite and to uses of said film in various applications, in particular in electrochemical and in photo-electrochemical applications.

BACKGROUND ART

Lithium metal polymer (LMP) batteries are known in the art wherein the anode is a Li metal foil and the separator is an electrolyte solid polymer blend of a poly(alkylene oxide) with a fluoropolymer, preferably a vinylidene fluoride polymer, incorporating an electrolytic salt.

These separators are typically obtained by film extrusion. Unfortunately, one drawback of this technology is the low ionic conductivity of the separators so obtained at temperatures below 80° C.

A challenge in this field is thus to enhance ionic conductivity of these separators to make extrusion technologies more attractive, while providing safe separators ensuring good separation of the electrodes.

SUMMARY OF INVENTION

It has been now found that fluoropolymer hybrid organic/inorganic composites are successfully obtainable by processing in molten phase the composition of the invention, thus avoiding use of polluting organic solvents.

Also, it has been found that the fluoropolymer hybrid organic/inorganic composite obtainable by the process of the invention is advantageously in the form of regular pellets which are free flowing and can thus be easily handled and processed in molten phase.

Further, it has been found that one or more electrolytic salts may be easily incorporated and/or dispersed within the fluoropolymer hybrid organic/inorganic composite of the invention thereby providing separators for both electrochemical devices and photo-electrochemical devices having homogeneous properties.

In particular, it has been found that the fluoropolymer hybrid organic/inorganic composite obtainable by the process of the invention successfully enables manufacturing separators for both electrochemical devices and photo-electrochemical devices exhibiting outstanding ionic conductivity properties.

In a first instance, the present invention pertains to a composition [composition (C)] comprising:
- an aqueous medium comprising at least one pre-gel metal compound [compound (GM)] obtainable by at least partial hydrolysis and/or polycondensation of at least one metal compound [compound (M)] of formula (I):

wherein M is a metal selected from the group consisting of Si, Ti and Zr, X and Y, equal to or different from each other and at each occurrence, are selected from hydrocarbon groups, optionally comprising one or more functional groups, and m is an integer comprised between 1 and 4,
- at least one functional fluoropolymer comprising at least one hydroxyl group [polymer (FF)], and
- at least one poly(alkylene oxide) (PAO) of formula (II):

wherein $R_A$ is a hydrogen atom or a $C_1$-$C_5$ alkyl group, $R_B$ is a hydrogen atom or a —$CH_3$ alkyl group and n is an integer comprised between 2000 and 40000, preferably between 4000 and 35000, more preferably between 11500 and 30000.

The composition (C) is particularly suitable for use in a process for manufacturing a fluoropolymer hybrid organic/inorganic composite [composite (H)].

The process for manufacturing a fluoropolymer hybrid organic/inorganic composite [composite (H)] typically comprises processing in molten phase a composition [composition (C)] comprising:
- an aqueous medium comprising at least one pre-gel metal compound [compound (GM)] obtainable by at least partial hydrolysis and/or polycondensation of at least one metal compound [compound (M)] of formula (I):

wherein M is a metal selected from the group consisting of Si, Ti and Zr, X and Y, equal to or different from each other and at each occurrence, are selected from hydrocarbon groups, optionally comprising one or more functional groups, and m is an integer comprised between 1 and 4,
- at least one functional fluoropolymer comprising at least one hydroxyl group [polymer (FF)], and
- at least one poly(alkylene oxide) (PAO) of formula (II):

wherein $R_A$ is a hydrogen atom or a $C_1$-$C_5$ alkyl group, $R_B$ is a hydrogen atom or a —$CH_3$ alkyl group and n is an integer comprised between 2000 and 40000, preferably between 4000 and 35000, more preferably between 11500 and 30000.

Under the process for manufacturing the composite (H) of the invention, the composition (C) is processed in molten phase, typically using an extruder, preferably a twin screw extruder.

In a second instance, the present invention pertains to the fluoropolymer hybrid organic/inorganic composite [composite (H)] obtainable by the process of the invention.

The composite (H) is typically in the form of pellets.

The composite (H) is particularly suitable for use in a process for manufacturing a fluoropolymer film.

The composite (H) may be further compounded with at least one metal salt [salt (M)] and, optionally, at least one fluoropolymer [polymer (F)] thereby providing a compounded fluoropolymer hybrid organic/inorganic composite [composite (H')], said composite (H') comprising:
- at least one fluoropolymer hybrid organic/inorganic composite [composite (H)],
- at least one metal salt [salt (M)], and
- optionally, at least one fluoropolymer [polymer (F)].

The composite (H') is typically in the form of pellets.

The composite (H') is particularly suitable for use in a process for manufacturing a fluoropolymer film.

Thus, in a third instance, the present invention pertains to a process for manufacturing a fluoropolymer film, said process comprising processing in molten phase at least one composite (H) or at least one composite (H').

The process for manufacturing a fluoropolymer film according to the invention advantageously comprises processing in molten phase, typically using an extruder, preferably a single screw extruder, at least one composite (H) or at least one composite (H').

The fluoropolymer film is typically manufactured by processing in molten phase at least one composite (H) or at least one composite (H') using film extrusion techniques such as cast film extrusion or blown film extrusion.

The salt (M) is typically provided either in powder form or as an aqueous solution comprising the same.

The nature of the salt (M) is not particularly limited.

The salt (M) is typically selected from the group consisting of MeI, $Me(PF_6)_n$, $Me(BF_4)_n$, $Me(ClO_4)_n$, $Me(bis(oxalato)borate)_n$ ("$Me(BOB)_n$"), $MeCF_3SO_3$, $Me[N(CF_3SO_2)_2]_n$, $Me[N(C_2F_5SO_2)_2]_n$, $Me[N(CF_3SO_2)(RFSO_2)]_n$, wherein RF is $C_2F_5$, $C_4F_9$ or $CF_3OCF_2CF_2$, $Me(AsF_6)_n$, $Me[C(CF_3SO_2)_3]_n$ and $Me_2S_n$, wherein Me is a metal, preferably a transition metal, an alkaline metal or an alkaline-earth metal, more preferably Me being Li, Na, K or Cs, even more preferably Me being Li, and n is the valence of said metal, typically n being 1 or 2.

The salt (M) is preferably selected from the group consisting of $MeCF_3SO_3$, $Me[N(CF_3SO_2)_2]_n$, $Me[N(C_2F_5SO_2)_2]_n$, $Me[N(CF_3SO_2)(RFSO_2)]_n$, wherein RF is $C_2F_5$, $C_4F_9$ or $CF_3OCF_2CF_2$, $Me(AsF_6)_n$, $Me[C(CF_3SO_2)_3]_n$ and $Me_2S_n$, wherein Me is a metal, preferably a transition metal, an alkaline metal or an alkaline-earth metal, more preferably Me being Li, Na, K or Cs, even more preferably Me being Li, and n is the valence of said metal, typically n being 1 or 2.

In a fourth instance, the present invention pertains to the fluoropolymer film obtainable by the process of the invention.

The fluoropolymer film of the invention typically comprises at least one fluoropolymer hybrid organic/inorganic composite [composite (H)] or at least one compounded fluoropolymer hybrid organic/inorganic composite [composite (H')].

The fluoropolymer film of the invention is typically a dense film.

For the purpose of the present invention, the term "dense" is intended to denote a film free from pores.

The fluoropolymer film of the invention typically has a thickness comprised between 2 μm and 30 μm, preferably between 5 μm and 100 μm, more preferably between 10 μm and 40 μm.

In a fifth instance, the present invention pertains to an electrochemical device or a photo-electrochemical device comprising at least one fluoropolymer film.

The fluoropolymer film of the invention is suitable for use in electrochemical devices or in photo-electrochemical devices.

Non-limiting examples of suitable electrochemical devices include secondary batteries, preferably Lithium-ion batteries.

The fluoropolymer film of the invention may be advantageously used for the manufacture of components for electrochemical devices, preferably for secondary batteries.

The fluoropolymer film of the invention is particularly suitable for use as separator for electrochemical devices, preferably for secondary batteries, more preferably for Lithium-ion batteries.

For the purpose of the present invention, the term "fluoropolymer [polymer (F)]" is intended to denote a fluoropolymer comprising recurring units derived from at least one fluorinated monomer.

The polymer (F) may further comprise recurring units derived from at least one hydrogenated monomer.

The polymer (FF) is typically a polymer (F) further comprising recurring units derived from at least one functional monomer comprising at least one hydroxyl group [monomer (OH)].

The polymer (FF) typically comprises recurring units derived from at least one fluorinated monomer and from at least one functional monomer comprising at least one hydroxyl group [monomer (OH)].

The term "at least one fluorinated monomer" is understood to mean that the fluoropolymer may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one hydrogenated monomer" is understood to mean that the fluoropolymer may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

The term "at least one monomer (OH)" is understood to mean that the fluoropolymer may comprise recurring units derived from one or more than one monomers (OH). In the rest of the text, the expression "monomer (OH)" is understood, for the purposes of the present invention, both in the plural and the singular, that is to say that they denote both one or more than one monomers (OH) as defined above.

The monomer (OH) of the polymer (FF) may be selected from the group consisting of fluorinated monomers comprising at least one hydroxyl group and hydrogenated monomers comprising at least one hydroxyl group.

By the term "fluorinated monomer", it is hereby intended to denote an ethylenically unsaturated monomer comprising at least one fluorine atom.

By the term "hydrogenated monomer", it is hereby intended to denote an ethylenically unsaturated monomer comprising at least one hydrogen atom and free from fluorine atoms.

Should the fluorinated monomer comprise at least one hydrogen atom, it is designated as hydrogen-containing fluorinated monomer.

Should the fluorinated monomer be free of hydrogen atoms, it is designated as per(halo)fluoromonomer.

The fluorinated monomer may further comprise one or more other halogen atoms (Cl, Br, I).

Non-limiting examples of suitable fluorinated monomers include, notably, the followings:

$C_3$-$C_8$ perfluoroolefins, such as tetrafluoroethylene and hexafluoropropylene;

$C_2$-$C_8$ hydrogenated fluoroolefins, such as vinylidene fluoride, vinyl fluoride, 1,2-difluoroethylene and trifluoroethylene;

perfluoroalkylethylenes of formula $CH_2=CH-R_{f0}$, wherein $R_{f0}$ is a $C_1$-$C_6$ perfluoroalkyl group;

chloro- and/or bromo- and/or iodo-$C_2$-$C_6$ fluoroolefins, such as chlorotrifluoroethylene;

(per)fluoroalkylvinylethers of formula $CF_2=CFOR_{f1}$, wherein $R_{f1}$ is a $C_1$-$C_6$ fluoro- or perfluoroalkyl group, e.g. $CF_3$, $C_2F_5$, $C_3F_7$;

$CF_2=CFOX_0$ (per)fluoro-oxyalkylvinylethers, wherein $X_0$ is a $C_1$-$C_{12}$ alkyl, or a $C_1$-$C_{12}$ oxyalkyl, or a $C_1$-$C_{12}$ (per)fluorooxyalkyl group comprising one or more ether groups, such as perfluoro-2-propoxy-propyl group;

(per)fluoroalkylvinylethers of formula $CF_2=CFOCF_2OR_{f2}$, wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group comprising one or more ether groups, such as —$C_2F_5$—O—$CF_3$;

functional (per)fluoro-oxyalkylvinylethers of formula $CF_2=CFOY_0$, wherein $Y_0$ is a $C_1$-$C_{12}$ alkyl or (per) fluoroalkyl, or a $C_1$-$C_{12}$ oxyalkyl, or a $C_1$-$C_{12}$ (per) fluorooxyalkyl group comprising one or more ether groups and $Y_0$ comprises a carboxylic or sulfonic acid group, in its acid, acid halide or salt form; and fluorodioxoles, preferably perfluorodioxoles.

Should the fluorinated monomer be a hydrogen-containing fluorinated monomer, such as for instance vinylidene fluoride, trifluoroethylene, vinyl fluoride, the fluoropolymer comprises recurring units derived from said at least one hydrogen-containing fluorinated monomer and, optionally, from at least one other monomer.

Should the fluorinated monomer be a per(halo)fluoromonomer, such as for instance tetrafluoroethylene, chlorotrifluoroethylene, hexafluoropropylene, (per)fluoroalkyl-vinylethers, the fluoropolymer comprises recurring units derived from at least one per(halo)fluoromonomer and from at least one hydrogenated monomer.

Non-limiting examples of suitable hydrogenated monomers include, notably, ethylene, propylene, vinyl monomers such as vinyl acetate, and styrene monomers such as styrene and p-methylstyrene.

The polymer (F) comprises preferably more than 25% by moles, preferably more than 30% by moles, more preferably more than 40% by moles of recurring units derived from at least one fluorinated monomer.

The polymer (F) typically comprises more than 1% by moles, preferably more than 5% by moles, more preferably more than 10% by moles of recurring units derived from at least one hydrogenated monomer.

The polymer (F) preferably comprises recurring units derived from at least one fluorinated monomer selected from the group consisting of vinylidene fluoride (VDF), tetrafluoroethylene (TFE) and chlorotrifluoroethylene (CTFE).

The polymer (F) is more preferably selected from the group consisting of polymers (F-1) comprising recurring units derived from vinylidene fluoride (VDF), and, optionally, from at least one fluorinated monomer different from VDF.

The polymer (F-1) preferably comprises recurring units derived from:
(a) at least 60% by moles, preferably at least 75% by moles, more preferably at least 85% by moles of vinylidene fluoride (VDF), and
(b) optionally, from 0.1% to 15% by moles, preferably from 0.1% to 12% by moles, more preferably from 0.1% to 10% by moles of a fluorinated monomer selected from the group consisting of vinyl fluoride, chlorotrifluoroethylene (CTFE), hexafluoropropylene (HFP), tetrafluoroethylene (TFE), trifluoroethylene (TrFE), perfluoromethylvinylether (PMVE) and mixtures therefrom.

The polymer (F) may be amorphous or semi-crystalline.

The term "amorphous" is hereby to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

The polymer (FF) preferably comprises at least 0.01% by moles, more preferably at least 0.05% by moles, even more preferably at least 0.1% by moles of recurring units derived from at least one monomer (OH) as defined above.

The polymer (FF) preferably comprises at most 20% by moles, more preferably at most 15% by moles, even more preferably at most 10% by moles, most preferably at most 3% by moles of recurring units derived from at least one monomer (OH) as defined above.

Determination of average mole percentage of monomer (OH) recurring units in the polymer (FF) can be performed by any suitable method. Mention can be notably made of acid-base titration methods or of NMR methods.

The monomer (OH) is typically selected from the group consisting of hydrogenated monomers comprising at least one hydroxyl group.

The monomer (OH) is preferably selected from the group consisting of (meth)acrylic monomers of formula (III) and vinylether monomers of formula (IV):

wherein each of $R_1$, $R_2$ and $R_3$, equal to or different from each other, is independently a hydrogen atom or a $C_1$-$C_3$ hydrocarbon group, and $R_{OH}$ is a $C_1$-$C_5$ hydrocarbon group comprising at least one hydroxyl group.

The monomer (OH) is preferably of formula (III) as defined above.

The monomer (OH) is more preferably of formula (III'):

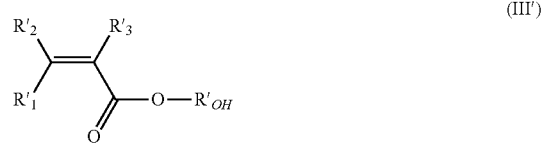

wherein $R'_1$, $R'_2$ and $R'_3$ are hydrogen atoms and $R'_{OH}$ is a $C_1$-$C_5$ hydrocarbon group comprising at least one hydroxyl group.

Non-limiting examples of monomers (OH) include, notably, hydroxyethyl (meth)acrylate, hydroxypropyl(meth) acrylate and hydroxyethylhexyl(meth)acrylate.

The monomer (OH) is most preferably selected from the group consisting of:

hydroxyethylacrylate (HEA) of formula:

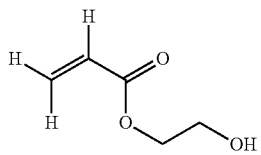

2-hydroxypropyl acrylate (HPA) of either of formulae:

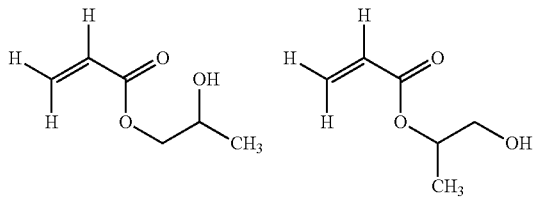

and mixtures thereof.

The polymer (FF) more preferably comprises recurring units derived from:
(a') at least 60% by moles, preferably at least 75% by moles, more preferably at least 85% by moles of vinylidene fluoride (VDF),
(b') optionally, from 0.1% to 15% by moles, preferably from 0.1% to 12% by moles, more preferably from 0.1% to 10% by moles of a fluorinated monomer selected from the group consisting of vinyl fluoride, chlorotrifluoroethylene (CTFE), hexafluoropropylene (HFP), tetrafluoroethylene (TFE), trifluoroethylene (TrFE), perfluoromethylvinylether (PMVE) and mixtures therefrom, and
(c') from 0.01% to 20% by moles, preferably from 0.05% to 15% by moles, more preferably from 0.1% to 10% by moles of at least one (meth)acrylic monomer of formula (III) as defined above.

The compound (M) of formula (I) may comprise one or more functional groups on any of groups X and Y, preferably on at least one group X.

In case the compound (M) of formula (I) as defined above comprises at least one functional group, it will be designated as functional metal compound [functional compound (M)]; in case none of groups X and Y comprises a functional group, the compound (M) of formula (I) as defined above will be designated as non-functional metal compound [non-functional compound (M)].

Mixtures of one or more functional compounds (M) and one or more non-functional compounds (M) may be used in the process of the invention. Otherwise, functional compound(s) (M) or non-functional compound(s) (M) may be separately used.

The compound (M) of formula (I) is preferably of formula (I-A):

$$R^1_{4-m'}M(OR^2)_{m'} \quad (I-A)$$

wherein M is a metal selected from the group consisting of Si, Ti and Zr, $R^1$ and $R^2$, equal to or different from each other and at each occurrence, are selected from the group consisting of $C_1$-$C_{18}$ hydrocarbon groups, optionally comprising one or more functional groups, and m' is an integer comprised between 1 and 4.

Non-limiting examples of functional groups include epoxy groups, carboxylic acid groups (in acid, ester, amide, anhydride, salt or halide form), sulphonic groups (in acid, ester, salt or halide form), hydroxyl groups, phosphoric acid groups (in acid, ester, salt, or halide form), thiol groups, amine groups, quaternary ammonium groups, ethylenically unsaturated groups (like vinyl groups), cyano groups, urea groups, organo-silane groups, aromatic groups.

Should the compound (M) of formula (I) be a functional compound (M), it is preferably of formula (I-B):

$$R^3_{4-m''}M(OR^4)_{m''} \quad (I-B)$$

wherein M is a metal selected from the group consisting of Si, Ti and Zr, $R^3$, equal to or different from each other and at each occurrence, is a $C_1$-$C_{12}$ hydrocarbon group comprising one or more functional groups, $R^4$, equal to or different from each other and at each occurrence, is a $C_1$-$C_5$ linear or branched alkyl group, preferably $R^4$ is a methyl or an ethyl group, and m'' is an integer comprised between 2 and 3.

Examples of functional compounds (M) are notably vinyltriethoxysilane, vinyltrimethoxysilane, vinyltrismethoxyethoxysilane of formula $CH_2=CHSi(OC_2H_4OCH_3)_3$, 2-(3,4-epoxycyclohexylethyltrimethoxysilane) of formula:

glycidoxypropylmethyldiethoxysilane of formula:
glycidoxypropyltrimethoxysilane of formula:

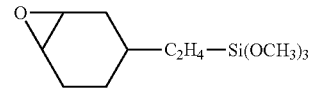

methacryloxypropyltrimethoxysilane of formula:

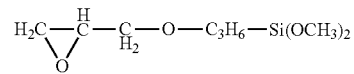

aminoethylaminpropylmethyldimethoxysilane of formula:

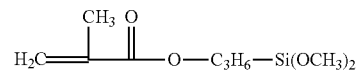

aminoethylaminpropyltrimethoxysilane of formula:

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

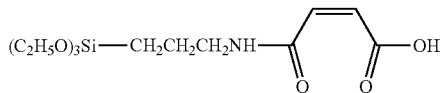

3-(trihydroxysilyl)-1-propane-sulphonic acid of formula HOSO$_2$—. CH$_2$CH$_2$CH$_2$—Si(OH)$_3$, N-(trimethoxysilylpropyl)ethylene-diamine triacetic acid, and its sodium salts, 3-(triethoxysilyl)propylsuccinic anhydride of formula:

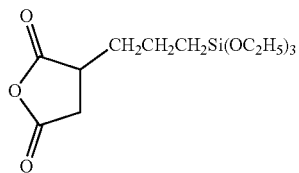

acetamidopropyltrimethoxysilane of formula H$_3$C—C(O)NH—CH$_2$CH$_2$CH$_2$—Si(OCH$_3$)$_3$, alkanolamine titanates of formula Ti(A)$_x$(OR)$_y$, wherein A is an amine-substituted alkoxy group, e.g. OCH$_2$CH$_2$NH$_2$, R is an alkyl group, and x and y are integers such that x+y=4.

Examples of non-functional compounds (M) are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

Under the process for manufacturing the composite (H) of the invention, the compound (M) of formula (I) is partially hydrolysed and/or polycondensed in the presence of an aqueous medium.

By the term "aqueous medium", it is hereby intended to denote a liquid medium comprising water in the liquid state at 20° C. under atmospheric pressure.

The weight ratio of the compound (M) of formula (I) to the aqueous medium is typically comprised between 50:1 and 1:50, preferably between 20:1 and 1:20, more preferably between 10:1 and 1:10.

The aqueous medium may further comprise at least one acid catalyst.

The aqueous medium typically further comprises from 0.5% to 10% by weight, preferably from 1% by weight to 5% by weight of at least one acid catalyst.

The selection of the acid catalyst is not particularly limited.

The acid catalyst is typically selected from the group consisting of organic and inorganic acids. The acid catalyst is preferably selected from the group consisting of organic acids.

Very good results have been obtained with citric acid.

The aqueous medium may also further comprise one or more organic solvents.

Non-limiting examples of suitable organic solvents include, notably, the followings:

aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide, dioxane, tetrahydrofuran (THF), glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, glycol ether esters such as ethylene glycol methyl ether acetate, ethylene glycol monoethyl ether acetate, ethylene glycol monobutyl ether acetate, alcohols such as methyl alcohol, ethyl alcohol, diacetone alcohol, ketones such as acetone, methylethylketone, methylisobutyl ketone, diisobutylketone, cyclohexanone, isophorone, and linear or cyclic esters such as isopropyl acetate, n-butyl acetate, methyl acetoacetate, dimethyl phthalate, γ-butyrolactone.

For embodiments wherein the aqueous medium comprises one or more further organic solvents, the aqueous medium is preferably free from solvents qualified as Carcinogenic, Mutagenic or Toxic to Reproduction according to chemical safety classification (CMR solvents); more specifically, the aqueous medium is advantageously free from N-methyl-2-pyrrolidone (NMP), N,N-diethylacetamide, dimethylformamide (DMF) and N,N-dimethylacetamide (DMAC).

The aqueous medium preferably further comprises at least one acid catalyst and one or more organic solvents (S).

The aqueous medium more preferably further comprises at least one acid catalyst and one or more alcohols.

Under the process for manufacturing the composite (H) of the invention, the hydrolysis and/or polycondensation of the compound (M) of formula (I) is usually carried out at room temperature or upon heating at a temperature lower than 100° C. The temperature will be selected having regards to the boiling point and/or stability of the aqueous medium. Temperatures comprised between 20° C. and 90° C., preferably between 20° C. and 50° C. will be preferred.

It is understood that, under the process for manufacturing the composite (H) of the invention, the groups Y of the compound (M) of formula (I) are partially hydrolysed and/or polycondensed in the presence of an aqueous medium so as to yield a pre-gel metal compound [compound (GM)].

As this will be recognized by the skilled in the art, the hydrolysis and/or polycondensation reaction usually generates low molecular weight side products, which can be notably water or alcohol, as a function of the nature of the compound (M) of formula (I) as defined above.

Thus, under the process for manufacturing the composite (H) of the invention, the aqueous medium comprising at least one compound (GM) typically further comprises one or more alcohols.

The compound (GM) typically comprises one or more domains of formula —[O-MX$_{4-m*}$(OY)$_{m*-2}$]O—, wherein M is a metal selected from the group consisting of Si, Ti and Zr, X and Y, equal to or different from each other and at each occurrence, are hydrocarbon groups, optionally comprising one or more functional groups, and m* is an integer comprised between 2 and 4.

Under the process for manufacturing the composite (H) of the invention, the composition (C) is processed in molten phase at a temperature typically comprised between 100° C. and 300° C., preferably between 150° C. and 250° C.

The skilled in the art will select the proper temperature as a function of the melting point of the polymer (FF).

The composition (C) typically comprises from 5% to 95% by weight, preferably from 20% to 80% by weight, more preferably from 30% to 60% by weight of at least one polymer (FF) based on the total weight of said at least one polymer (FF) and at least one PAO of formula (II).

The composition (C) may further comprise at least one fluoropolymer [polymer (F)] different from the polymer (FF) such as a non-functional fluoropolymer [non-functional polymer (F)].

For the purpose of the present invention, the term "non-functional polymer (F)" is intended to denote a fluoropolymer free from recurring units derived from at least one functional monomer such as a functional monomer comprising at least one hydroxyl group [monomer (OH)].

The selection of the non-functional polymer (F) is not particularly limited, provided that it does not interact with the compound (GM) and/or the PAO of formula (II).

It is understood that, under the process for manufacturing the composite (H) of the invention, at least a fraction of the compound (GM) is reacted with at least a fraction of the hydroxyl groups of the polymer (FF) and at least a fraction of the hydroxyl groups of the PAO of formula (II) thereby providing a composite (H).

The composite (H) typically comprises one or more domains of formula —[O-M(OZ$_1$)(OZ$_2$)]O—, wherein M is a metal selected from the group consisting of Si, Ti and Zr, and Z$_1$ and Z$_2$, equal to or different from each other, are hydrocarbon groups, optionally comprising one or more functional groups.

The composite (H) advantageously comprises from 0.01% to 60% by weight, preferably from 0.1% to 40% by weight of one or more domains of formula —[O-M(OZ$_1$)(OZ$_2$)]O—, wherein M is a metal selected from the group consisting of Si, Ti and Zr, and Z$_1$ and Z$_2$, equal to or different from each other, are hydrocarbon groups, optionally comprising one or more functional groups.

According to a first embodiment of the invention, the composite (H) comprises one or more domains of formula —[O-M(OZ$_1$)(OZ$_2$)]O—, wherein M is a metal selected from the group consisting of Si, Ti and Zr, and Z$_1$ and Z$_2$, equal to or different from each other, are hydrocarbon groups, optionally comprising one or more functional groups, at least one of said Z$_1$ and Z$_2$ being a hydrocarbon group comprising recurring units derived from at least one monomer (OH).

According to a second embodiment of the invention, the composite (H) comprises one or more domains of formula —[O-M(OZ$_1$)(OZ$_2$)]O—, wherein M is a metal selected from the group consisting of Si, Ti and Zr, and Z$_1$ and Z$_2$, equal to or different from each other, are hydrocarbon groups, optionally comprising one or more functional groups, at least one of said Z$_1$ and Z$_2$ being a hydrocarbon group comprising recurring units of formula —(CH$_2$CHR$_A$O)$_n$—, wherein R$_A$ is a hydrogen atom or a C$_1$-C$_5$ alkyl group and n is an integer comprised between 2000 and 40000, preferably between 4000 and 35000, more preferably between 11500 and 30000.

The composite (H) preferably comprises recurring units derived from at least one fluorinated monomer and from at least one functional monomer [monomer (OM)] comprising one or more domains of formula —[O-M(OZ$_1$)(OZ$_2$)]O—, wherein M is a metal selected from the group consisting of Si, Ti and Zr, and Z$_1$ and Z$_2$, equal to or different from each other, are hydrocarbon groups, optionally comprising one or more functional groups.

The term "at least one monomer (OM)" is understood to mean that the composite (H) may comprise recurring units derived from one or more than one monomer (OM). In the rest of the text, the expression "monomer (OM)" is understood, for the purposes of the present invention, both in the plural and the singular, that is to say that they denote both one or more than one monomers (OM) as defined above.

Should the monomer (OH) be a fluorinated monomer comprising at least one hydroxyl group, the monomer (OM) is a fluorinated monomer comprising one or more domains of formula —[O-M(OZ$_1$)(OZ$_2$)]O—, wherein M is a metal selected from the group consisting of Si, Ti and Zr, and Z$_1$ and Z$_2$, equal to or different from each other, are hydrocarbon groups, optionally comprising one or more functional groups.

Should the monomer (OH) be a hydrogenated monomer comprising at least one hydroxyl group, the monomer (OM) is a hydrogenated monomer comprising one or more domains of formula —[O-M(OZ$_1$)(OZ$_2$)]O—, wherein M is a metal selected from the group consisting of Si, Ti and Zr, and Z$_1$ and Z$_2$, equal to or different from each other, are hydrocarbon groups, optionally comprising one or more functional groups.

The monomer (OM) is preferably selected from the group consisting of (meth)acrylic monomers of formula (III-A) or vinylether monomers of formula (IV-A):

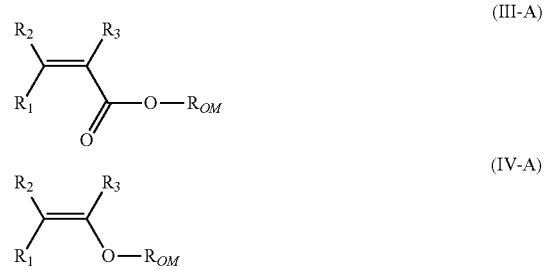

wherein each of R$_1$, R$_2$ and R$_3$, equal to or different from each other, is independently a hydrogen atom or a C$_1$-C$_3$ hydrocarbon group, and ROM is a C$_1$-C$_5$ hydrocarbon group comprising one or more domains of formula —[O-M(OZ$_1$)(OZ$_2$)]O—, wherein M is a metal selected from the group consisting of Si, Ti and Zr, and Z$_1$ and Z$_2$, equal to or different from each other, are hydrocarbon groups, optionally comprising one or more functional groups.

The monomer (OM) is preferably of formula (III-A).

The monomer (OM) is more preferably of formula (III'-A):

wherein each of $R'_1$, $R'_2$ and $R'_3$, equal to or different from each other, is independently a hydrogen atom or a $C_1$-$C_3$ hydrocarbon group, and $R'_{OM}$ is a $C_1$-$C_5$ hydrocarbon group comprising one or more domains of formula —[O-M(OZ$_1$)(OZ$_2$)]O—, wherein M is a metal selected from the group consisting of Si, Ti and Zr, and $Z_1$ and $Z_2$, equal to or different from each other, are hydrocarbon groups, optionally comprising one or more functional groups.

The composite (H') typically further comprises at least one fluoropolymer [polymer (F)].

Should the composite (H') further comprise at least one polymer (F), said at least one polymer (F) is preferably a non-functional polymer (F).

The composite (H') typically comprises:

from 30% to 99% by weight, preferably from 50% to 95% by weight, more preferably from 60% to 90% by weight of at least one composite (H), from 1% to 70% by weight, preferably from 5% to 50% by weight, more preferably from 10% to 40% by weight of at least one salt (M), and optionally, from 1% to 60% by weight, preferably from 5% to 40% by weight, more preferably from 10% to 30% by weight of at least one polymer (F).

According to an embodiment of the process for manufacturing the composite (H) of the invention, an inorganic filler [filler (I)] may be further used.

The filler (I) may by fed separately or may be added to the aqueous medium comprising the compound (GM) or may be added to the composition (C).

The filler (I), if any, is typically added to the composition (C) in an amount of from 0.1% to 90% by weight based on the total weight of said composition (C).

The filler (I) is typically provided under the form of particles. The filler (I) particles generally have an average size comprised between 0.001 μm and 1000 μm, preferably between 0.01 μm and 800 μm, more preferably between 0.03 μm and 500 μm.

The selection of the filler (I) is not particularly limited; nevertheless, fillers (I) having on their surface reactive groups towards the compound (GM) are generally preferred.

Among reactive groups, mention can be notably made of hydroxyl groups.

Among fillers (I) suitable for use in the process of the invention, mention can be made of inorganic oxides, including metal oxides, metal sulphates, metal carbonates, metal sulphides and the like.

Among metal oxides, mention can be made of $SiO_2$, $TiO_2$, ZnO and $Al_2O_3$.

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the scope of the present invention.

Raw Materials:

Polymer (FF-1): VDF-HEA (0.8% by moles) having a Melt Flow Index (MFI) of 15 g/min (2.16 Kg, 230° C.).

Polymer (FF-2): VDF-HEA (0.8% by moles)-HFP (2.4% by moles) having a Melt Flow Index (MFI) of 15 g/min (2.16 Kg, 230° C.).

Polymer (FF-3): VDF-HEA (0.8% by moles)-HFP (5% by moles) having a Melt Flow Index (MFI) of 15 g/min (2.16 Kg, 230° C.).

PAO-1: poly(ethylene oxide) having an average molecular weight comprised between 1000000 and 1200000.

Determination of Ionic Conductivity

The membrane was put into a cell containing two stainless steel blocking electrodes. The cell was placed in an oven and conditioned for one hour at each temperature before measurement of the ionic conductivity.

The resistance of the membrane was measured at different temperatures.

The ionic conductivity (σ) was calculated using the following equation:

$$\text{Ionic conductivity } (\sigma) = d/(R_b \times S)$$

wherein d is the thickness [cm] of the film, $R_b$ is the bulk resistance [Ω] and S is the area [cm$^2$] of the stainless steel electrode.

Manufacture of the Polymer (FF-1)

In a 80 lt. reactor equipped with an impeller running at a speed of 300 rpm were introduced in sequence 48204 g of demineralised water and 20.2 g of METHOCEL® K100 GR suspending agent. The reactor was vented and pressurized with nitrogen to 1 bar, then 10.8 g of hydroxyethylacrylate (HEA) monomer and 127.7 g of diethylcarbonate (DEC) were introduced in the reactor, followed by 204 g of a 75% by weight solution of t-amyl perpivalate initiator in isododecane, and 25187 g of vinylidene fluoride (VDF) monomer. The reactor was then gradually heated to 52° C. to a final pressure of 110 bar. Temperature was maintained constant at 52° C. throughout the whole trial. Pressure was maintained constant at 110 bar throughout the whole trial by feeding a 19.9 g/l aqueous solution of HEA monomer to a total of 16.5 kg. After 7 h26, the polymerization run was stopped by degassing the suspension until reaching atmospheric pressure. The polymer so obtained was then recovered, washed with demineralised water and oven-dried at 65° C. The amount of VDF-HEA copolymer so obtained was 19.1 Kg.

Manufacture of the Polymer (FF-2)

In a 80 lt. reactor equipped with an impeller running at a speed of 300 rpm were introduced in sequence 58242 g of demineralised water and 11.1 g of METHOCEL® K100 GR suspending agent. The reactor was purged with sequence of vacuum (30 mmHg) and purged of nitrogen at 20° C. Then 21.6 g of hydroxyethylacrylate (HEA) and 1873 g of hexafluoropropylene (HFP) monomers were introduced in the reactor, followed by 149.9 g of a 75% by weight solution of t-amyl perpivalate initiator in isododecane. Finally, 16597 g of vinylidene fluoride (VDF) were introduced in the reactor. The reactor was gradually heated until a set-point temperature at 57° C. and the pressure was fixed at 110 bar. The pressure was kept constantly equal to 110 bars by feeding 13 kg of aqueous solution containing a 240.6 g of HEA during the polymerization. After this feeding, no more aqueous solution was introduced and the pressure started to decrease until 80 bar. Then, the polymerization was stopped by degassing the reactor until reaching atmospheric pressure. In general a conversion around 75% of monomers was obtained. The polymer so obtained was then recovered, washed with demineralised water and oven-dried at 65° C.

Manufacture of the Polymer (FF-3)

In a 80 lt. reactor equipped with an impeller running at a speed of 300 rpm were introduced in sequence 57609 g of demineralised water and 12.1 g of METHOCEL® K100 GR suspending agent. The reactor was purged with sequence of vacuum (30 mmHg) and purged of nitrogen at 20° C. Then 149.9 g of a 75% by weight solution of t-amyl perpivalate initiator in isododecane were introduced in the reactor, followed by 8.2 g of hydroxyethylacrylate (HEA) and 4087 g of hexafluoropropylene (HFP) monomers. Finally, 16144 g of vinylidene fluoride (VDF) were introduced in the reactor. The reactor was gradually heated until a set-point temperature at 58° C. and the pressure was fixed at 110 bars. The pressure was kept constantly equal to 110 bars by feeding 13.6 kg of aqueous solution containing a 193 g of HEA during the polymerization. After this feeding, no more aqueous solution was introduced and the pressure started to decrease until 80 bar. The polymerization was stopped by degassing the reactor until reaching atmospheric pressure. A conversion at 79% of monomers was reached. The polymer so obtained was then recovered, washed with demineralised water and oven-dried at 65° C.

Manufacture of a Fluoropolymer Hybrid Organic/Inorganic Composite—General Procedure The process was carried out in a twin screw co-rotating intermeshing extruder (Leistritz 18 ZSE 18 HP having a screw diameter D of 18 mm and a screw length of 720 mm (40 D)). The extruder was equipped with a main feeder and two degassing units. The barrel was composed of eight temperature controlled zones and a cooled one (at the feeder) that allow to set the desired temperature profile. The die was composed of two holes having each a diameter of 3 mm. The two extrudates were cooled in a water tank. Subsequently, the material was at the same time pulled by a pull roller and dried by compressed air just before being cut-off in pellets.

Under step (i), a pre-gel metal compound having a theoretical amount of $SiO_2$ of about 18% by weight was manufactured as follows:

a) in a 500 ml beaker equipped with a magnetic stirrer running at a moderated speed the following ingredients were introduced in sequence:

TEOS: 200 g
Water: 69.45 g (molar ratio TEOS:$H_2O$=1:4)
Ethanol: 50 g (weight ratio TEOS:EtOH=4:1)
Citric acid: 2.69 g (1% by weight of TEOS+$H_2O$); and b) the system was left at room temperature for about 3 hours. The pre-gel metal compound so obtained system was maintained under vigorous stirring during all the process.

Under step (ii), each of the polymers (FF-1), (FF-2) and (FF-3) and the PAO-1 were mixed and fed together to the extruder from the main hopper. Simultaneously, the pre-gel metal compound provided in step (i) was also fed to the extruder through the main hopper.

The screw profile for this step was composed of a region of conveying elements with a regular decrease of pitch (from zone 0 to 1), then a kneading block composed by two kneading elements (zone 2), then a long conveying zone (from zone 3 to 4); after this series of elements, two kneading blocks, composed by three kneading elements and alternated with two conveying elements were located (from zone 4 to 6). Finally four conveying elements and a degassing unit were situated before the die exit (zone 6 to 8).

The temperature profiles used are reported in Table 1 here below. Depending on the melting point of the polymer (FF), two different profiles were used: profile A for the polymer (FF-2) and the polymer (FF-3) and profile B for the polymer (FF-1). The extruder rotation speed was 350 rpm.

TABLE 1

| Zone | 0 | 1 | 2 | 3 | 4 | 5 | 6 | 7 |
|---|---|---|---|---|---|---|---|---|
| Profile A [° C.] | 90 | 100 | 100 | 120 | 160 | 160 | 160 | 165 |
| Profile B [° C.] | 90 | 100 | 100 | 120 | 180 | 180 | 180 | 185 |

Under step (iii), the pellets provided in step (ii) and a $Li[N(CF_3SO_2)_2]$(LiTFSI) water solution (50% by weight) were fed to the extruder through the main hopper. The pellets were charged with a gravimetric feeder and the LiTFSI aqueous solution with a peristaltic pump.

The screw profile for this step was composed by a first conveying zone (zones 0 and 1), then a kneading block formed by three kneading elements (zone 2); after these blocks there was a long conveying zone in which the pitch of the screw is maximum (zone 3). In this zone a degassing unit, at atmospheric pressure, was present. Then, there was a kneading block composed by two kneading elements and a backflow element (zone 5). After this block the screw was composed by a conveying zone with maximum pitch (zone 6); in this zone a degassing unit at −400 mbar was present to evacuate mainly the water vapour present in the LiTFSI solution. The final part of the screw (zones 7 and 8) was composed by conveying elements.

The temperature profiles used are reported in Table 2 here below. Depending on the melting point of the polymer (FF), two different profiles were used: profile C for the polymer (FF-2) and the polymer (FF-3) and profile D for the polymer (FF-1). The extruder rotation speed was 400 rpm.

TABLE 2

| Zone | 0 | 1 | 2 | 3 | 4 | 5 | 6 | 7 |
|---|---|---|---|---|---|---|---|---|
| Profile C [° C.] | 165 | 165 | 165 | 160 | 160 | 160 | 160 | 165 |
| Profile D [° C.] | 185 | 185 | 185 | 180 | 180 | 180 | 180 | 185 |

EXAMPLE 1

A powder blend of polymer (FF-1) and PAO-1 in a weight ratio of 31:69 was prepared.

A pre-gel metal compound was prepared under step (i). The pre-gel metal compound so obtained and the powder blend were fed continuously to the main hopper and extruded according to the temperature profile B. The rate for the polymer blend was 0.795 kg/h, the rate for the pre-gel metal compound was 0.520 kg/h.

The extrudate was pelletized and dried in a vacuum oven for 4 hours at 45° C. The composite so obtained contained 7.85% by weight of $SiO_2$ according to EDS measurements.

The pellets prepared under step (ii) and the LiTFSI solution were fed to the extruder at rates of 1.2 kg/h and 0.6 kg/h, respectively. The material was collected and cut by the pelletizer.

The composition of the final composite was the following: 73.7% by weight of a blend of polymer (FF-1) and PAO-1 (weight ratio polymer (FF-1):PAO-1=31:69), 6.3% by weight of $SiO_2$ and 20% by weight of LiTFSI. The ionic conductivity values of a film made of the composite so obtained are set forth in Table 3.

COMPARATIVE EXAMPLE 1

The same procedure under Example 1 was followed except that step (i) was omitted (no pre-gel metal compound was fed to the reactor).

Steps (ii) and (iii) were carried out simultaneously due to the absence of the pre-gel metal compound.

The composition of the final composite was the following: 80% by weight of a blend of polymer (FF-1) and PAO-1 (weight ratio polymer (FF-1):PAO-1=38:62) and 20% by weight of LiTFSI.

The ionic conductivity values of a film made of the composite so obtained are set forth in Table 3.

EXAMPLE 2

The same procedure under Example 1 was followed but replacing polymer (FF-1) with polymer (FF-2) and stopping the process after step (ii). The step (iii) was thus omitted.

The composition of the final composite was the following: 90.6% by weight of a blend of polymer (FF-2) and PAO-1 (weight ratio polymer (FF-2):PAO-1=31:69) and 9.4% by weight of $SiO_2$.

The composite so obtained was in the form of regular pellets which can be easily handled and processed in molten phase.

COMPARATIVE EXAMPLE 2

The same procedure under Example 2 was followed but steps (i) and (iii) were omitted. No pre-gel metal compound and no electrolytic salt were thus added to the composite. The extrudate of step (ii) had a remarkable die swell. The melt strength was very poor and, during the process, melt pulsation and breaking was observed. For these reasons, it was not possible to pull the material with the automatic system and to cut it with the cutter thereby obtaining regular pellets.

The final composite so obtained contained a blend of polymer (FF-2) and PAO-1 in a weight ratio of 31:69.

EXAMPLE 3

The same procedure under Example 1 was followed but using polymer (FF-2) instead of polymer (FF-1).

The ionic conductivity values of a film made of the composite so obtained are set forth in Table 3.

EXAMPLE 4

The same procedure under Example 1 was followed but using polymer (FF-3) instead of polymer (FF-1).

The ionic conductivity values of a film made of the composite so obtained are set forth in Table 3.

TABLE 3

| Example | Ionic conductivity (μS/mm) | | | | |
| --- | --- | --- | --- | --- | --- |
| | 23° C. | 40° C. | 55° C. | 70° C. | 80° C. |
| 1 | 3.09 | 6.45 | 21.8 | 29.8 | 78.7 |
| Comp. 1 | 1.22 | 2.24 | 13.4 | 20.5 | 38.5 |
| 3 | 3.77 | 6.49 | 17.5 | 35.3 | 51.5 |
| 4 | 3.71 | 8.86 | 22.6 | 36.7 | 65.9 |

In view of the above, it has been surprisingly found that either the composite (H) or the composite (H') obtainable by the process according to the invention is advantageously in the form of regular pellets which are free flowing and can thus be easily handled and processed in molten phase.

Also, it has been surprisingly found that either the composite (H) or the composite (H') obtainable by the process according to the invention successfully enables manufacturing separators for both electrochemical devices and photo-electrochemical devices exhibiting outstanding ionic conductivity values.

The invention claimed is:
1. A composition (C) comprising:
   an aqueous medium comprising at least one pre-gelled metal compound (GM) obtainable by at least partial hydrolysis and/or partial polycondensation of at least one metal compound (M) of formula (I):

$$X_{4-m}M(OY)_m \quad (I)$$

wherein M is a metal selected from the group consisting of Si, Ti and Zr, X and Y, equal to or different from each other and at each occurrence, are hydrocarbon groups, optionally comprising one or more functional groups, and m is an integer comprised between 1 and 4,
   at least one polymer (FF), wherein polymer (FF) is a functional fluoropolymer comprising at least one hydroxyl group, and
   at least one poly(alkylene oxide) (PAO) of formula (II):

$$HO{-}(CH_2CHR_AO)_n{-}R_B \quad (II)$$

wherein $R_A$ is a hydrogen atom or a $C_1$-$C_5$ alkyl group, $R_B$ is a hydrogen atom or a —$CH_3$ alkyl group and n is an integer comprised between 2000 and 40000.
2. The composition (C) according to claim 1, wherein polymer (FF) comprises recurring units derived from at least one fluorinated monomer and from at least one monomer (OH), wherein monomer (OH) is a functional monomer comprising at least one hydroxyl group.
3. The composition (C) according to claim 1, wherein monomer (OH) is selected from the group consisting of (meth)acrylic monomers of formula (III) and vinylether monomers of formula (IV):

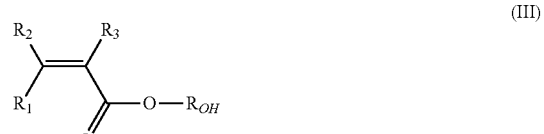

wherein each of $R_1$, $R_2$ and $R_3$, equal to or different from each other, is independently a hydrogen atom or a $C_1$-$C_3$ hydrocarbon group, and $R_{OH}$ is a $C_1$-$C_5$ hydrocarbon group comprising at least one hydroxyl group.
4. The composition (C) according to claim 1, wherein polymer (FF) comprises recurring units derived from:
   (a') at least 60% by moles of vinylidene fluoride (VDF),
   (b') optionally, from 0.1% to 15% by moles of a fluorinated monomer selected from the group consisting of vinyl fluoride, chlorotrifluoroethylene (CTFE), hexafluoropropylene (HFP), tetrafluoroethylene (TFE), trifluoroethylene (TrFE), perfluoromethylvinylether (PMVE) and mixtures therefrom, and
   (c') from 0.01% to 20% by moles of at least one (meth)acrylic monomer of formula (III).
5. The composition (C) according to claim 1, wherein compound (M) is of formula (I-A):

$$R^1_{4-m}M(OR^2)_{m'} \quad (I\text{-}A)$$

wherein M is a metal selected from the group consisting of Si, Ti and Zr, $R^1$ and $R^2$, equal to or different from each other and at each occurrence, are selected from the group consisting of $C_1$-$C_{18}$ hydrocarbon groups, optionally comprising one or more functional groups, and m' is an integer comprised between 1 and 4.

6. The composition (C) according to claim 1, wherein compound (GM) comprises one or more domains of formula —[O-MX$_{4-m*}$(OY)$_{m*-2}$]O—, wherein M is a metal selected from the group consisting of Si, Ti and Zr, X and Y, equal to or different from each other and at each occurrence, are hydrocarbon groups, optionally comprising one or more functional groups, and m* is an integer comprised between 2 and 4.

7. A process for manufacturing a fluoropolymer hybrid organic/inorganic composite (H), said process comprising processing in molten phase the composition (C) according to claim 1.

8. The process according to claim 7, wherein composition (C) is processed in molten phase, using an extruder.

9. A fluoropolymer hybrid organic/inorganic composite (H) obtainable by the process according to claim 7, said composite (H) comprising recurring units derived from at least one fluorinated monomer and from at least one functional monomer (OM) comprising one or more domains of formula —[O-M(OZ$_1$)(OZ$_2$)]O—, wherein M is a metal selected from the group consisting of Si, Ti and Zr, and $Z_1$ and $Z_2$, equal to or different from each other, are hydrocarbon groups, optionally comprising one or more functional groups.

10. A compounded fluoropolymer hybrid organic/inorganic composite (H') comprising:
    at least one composite (H) according to claim 9,
    at least one metal salt (M), and
    optionally, at least one polymer (F), wherein polymer (F) is a fluoropolymer.

11. A fluoropolymer film comprising at least one composite (H) according to claim 9.

12. A process for manufacturing the fluoropolymer film according to claim 11, said process comprising processing in molten phase the at least one composite (H).

13. The process according to claim 12, said process comprising processing in molten phase, using an extruder, the at least one composite (H).

14. An electrochemical device or a photo-electrochemical device comprising at least one fluoropolymer film according to claim 11.

15. A method for making an electrochemical device, wherein the method comprises using at least one fluoropolymer film according to claim 11 as a separator for such electrochemical devices.

16. The composition (C) according to claim 1 wherein n is an integer comprised between 4000 and 35000.

17. The composition (C) according to claim 1 wherein n is an integer comprised between 11500 and 30000.

18. The composition (C) according to claim 4, wherein polymer (FF) comprises recurring units derived from:
    (a') at least 75% by moles of vinylidene fluoride (VDF),
    (b') optionally, from 0.1% to 12% by moles of a fluorinated monomer selected from the group consisting of vinyl fluoride, chlorotrifluoroethylene (CTFE), hexafluoropropylene (HFP), tetrafluoroethylene (TFE), trifluoroethylene (TrFE), perfluoromethylvinylether (PMVE) and mixtures therefrom, and
    (c') from 0.05% to 15% by moles of at least one (meth) acrylic monomer of formula (III).

19. The composition (C) according to claim 4, wherein polymer (FF) comprises recurring units derived from:
    (a') at least 85% by moles of vinylidene fluoride (VDF),
    (b') optionally, from 0.1% to 10% by moles of a fluorinated monomer selected from the group consisting of vinyl fluoride, chlorotrifluoroethylene (CTFE), hexafluoropropylene (HFP), tetrafluoroethylene (TFE), trifluoroethylene (TrFE), perfluoromethylvinylether (PMVE) and mixtures therefrom, and
    (c') from 0.1% to 10% by moles of at least one (meth) acrylic monomer of formula (III).

\* \* \* \* \*